(12) United States Patent
Nielsen et al.

(10) Patent No.: US 7,050,822 B2
(45) Date of Patent: May 23, 2006

(54) METHOD FOR PROVIDING A BEST GUESS FOR AN INTENDED RECIPIENT OF A MESSAGE

(75) Inventors: Peter Dam Nielsen, Kgs. Lyngby (DK); Christian Kraft, Hvidovre (DK)

(73) Assignee: Nokia Corporation, Espoo (FI)

( * ) Notice: Subject to any disclaimer, the term of this patent is extended or adjusted under 35 U.S.C. 154(b) by 491 days.

(21) Appl. No.: 10/284,209

(22) Filed: Oct. 31, 2002

(65) Prior Publication Data

US 2004/0203949 A1   Oct. 14, 2004

(51) Int. Cl.
*H04Q 7/20* (2006.01)

(52) U.S. Cl. .................. 455/466; 455/412.1; 455/418

(58) Field of Classification Search ............... 455/553, 455/564, 565, 414, 418, 466, 412.1; 709/206, 709/226, 227, 207, 246; 345/173
See application file for complete search history.

(56) References Cited

U.S. PATENT DOCUMENTS

| | | | | |
|---|---|---|---|---|
| 6,032,053 A | * | 2/2000 | Schroeder et al. | 455/553.1 |
| 6,151,507 A | * | 11/2000 | Laiho et al. | 455/466 |
| 6,507,866 B1 | * | 1/2003 | Barchi | 709/207 |
| 6,681,217 B1 | * | 1/2004 | Lewak | 707/3 |
| 6,781,575 B1 | * | 8/2004 | Hawkins et al. | 345/173 |
| 2002/0052195 A1 | * | 5/2002 | Lee | 455/414 |
| 2003/0079017 A1 | * | 4/2003 | Agrawal et al. | 709/226 |
| 2003/0182543 A1 | * | 9/2003 | Keller et al. | 712/237 |
| 2003/0229717 A1 | * | 12/2003 | Teague | 709/246 |
| 2004/0018857 A1 | * | 1/2004 | Asokan et al. | 455/564 |
| 2004/0215726 A1 | * | 10/2004 | Arning et al. | 709/206 |

* cited by examiner

*Primary Examiner*—Tilahun Gesesse
*Assistant Examiner*—Tan Trinh
(74) *Attorney, Agent, or Firm*—Alston & Bird LLP

(57) ABSTRACT

The present invention is a method for providing a best guess for a recipient of a message. The method includes identifying a pattern in the message; searching for the pattern in a pattern list comprising one or more patterns for each addressee in an address list; registering an addressee in a hit list when the pattern is in the pattern list; and determining a first addressee from the hit list and providing the first addressee as a best guess as a recipient of the message.

23 Claims, 3 Drawing Sheets

METHOD FOR PROVIDING A BEST GUESS FOR AN INTENDED RECIPIENT OF A MESSAGE

BACKGROUND OF THE INVENTION

1. Field of Invention

The invention relates to a method for guessing an intended recipient of a message such as transmitted between two communication terminals in a wireless telecommunication network. In particular, this invention relates to a method for providing a best guess of a recipient of a message based on contents of the message.

2. Description of the Prior Art

The number of transmissions of messages in a computer or telecommunication network has in the recent years increased significantly. The short message service (SMS), and more recently the multimedia message service (MMS), have become important tools for handling business and common daily routines. Similarly, use of e-mails has accelerated communication between parties as well as expanded the geographical potential of communication between parties separated by great distances.

Lately, communication terminals have evolved to perform, in addition to voice communication, generation and transmission of text messages such as SMS messages as well as MMS messages comprising a video, picture or audio sequence. Furthermore, the communication terminals have evolved to include personal office assistant features such as calendar, address book, and even e-mail functions.

Due to the fact that the telecommunication message services and the e-mail services have increased, the number of applications to administrate, edit and handle messages have evolved.

U.S. Pat. No. 5,946,647, which hereby is incorporated by reference in the present specification, discloses a system and method for performing an action on a structure in computer generated data. The system and method identifies structures in computer data and associates specific actions with the structures. The user of the system or method enables the selection of an action and automatically performs the selected action on the identified structured. For example, when the system or method identifies an address using the "e-mail address grammar", actions for sending e-mails to the identified address and putting the identified address in an e-mail address book are linked to the address. However, the system or method during parsing of the computer data fails to provide means for automatically identifying a recipient of a message. In addition, the system or method relates entirely to a computer.

Further, the present messaging technology requires a user to manually input a recipient of a message or manually pick a recipient from a contact list. This obviously increases the overall transmission time of a message over a network.

SUMMARY OF THE INVENTION

The present invention provides a method overcoming the limitations and deficiency of previous methods.

The present invention provides an automated way of providing a best guess of a recipient of a message, which best guess is simultaneously generated from the message it self.

A particular aspect of the present invention is a method which simplifies communication between any number of communicating users of a network since the users may focus on the content of the communication rather than the addressing of the communication.

A particular feature of the present invention relates to the language detecting feature identifying the language of a message and on the basis of the language determining possible recipients.

The above advantages and features together with numerous other advantages and features, which will become evident from below detailed description, is obtained according to a first aspect of the present invention by a method for providing a best guess for a recipient of a message comprising:

(a) identifying a pattern in the message;
(b) searching for the pattern in a pattern list comprising one or more patterns for each addressee in an address list;
(c) registering an addressee in a hit list when the pattern is in the pattern list; and
(d) determining a first addressee from the hit list and providing the first addressee as a best guess for a recipient of the message.

The pattern according to the first aspect of the present invention may be identified in the message using a parser.

Hence the method may enable simultaneous entering of a message and identification of a recognizable pattern.

The message according to the first aspect of the present invention may comprise text matter, however it will be appreciated that the method may operate on recognizable patterns for images, series of images, video streams, series of video stream, audio recordings, series of audio recordings, or any combination thereof.

The message according to the first aspect of the present invention may comprise a short message service format, unstructured supplementary service data, a multimedia messaging format, an e-mail format, or any combinations thereof.

The pattern according to the first aspect of the present invention may comprise key words, key sounds, key image characteristics, or any combination thereof. Key words to be identified may comprise names (words starting with a capitol letter), unique words or a unique constellation of symbols (i.e. words or symbol constellations a match in a communication terminal's word dictionary), all words beyond a predetermined length, words in a foreign language, or any combination thereof.

The method according to the first aspect of the present invention may be implemented on a communication terminal such as a cellular or mobile phone, a personal digital assistant, or any combination thereof. Obviously, the method may further be implemented in a computer system or a computer program.

The method according to the first aspect of the present invention may further comprise recording of the pattern in the pattern list for a specific addressee in the address list. The method is a self learning procedure, where, in case the method fails to identify an addressee in the address list and thus cannot provide a best guess, then the method records the user interaction selecting a specific addressee for the message.

Other self-learning procedures for example such using artificial neural networks can be envisioned according to the present invention.

The method according to the first aspect of the present invention further comprises determining a second addressee from the hit list and providing the second addressee as a second best guess for a recipient of the message. In fact, the method may comprise a range of addressees and may provide a prioritized guess for the range of addressees, the range comprising up to 10 addressees in the hit list. In case no addressees are identified the method may initiate a learning procedure and record the user's manually selected or typed addressee and associate one or more patterns from the message with that particular addressee.

The pattern list according to the first aspect of the present invention may comprise a range of patterns for each addressee in the address list such as up to 5 patterns, up to 10 patterns or up to 20 patterns. The limitation for applying a plurality of patterns to each addressee obviously being the storage capacity, the gain of increasing number of patterns for each addressee is improved probability of success in guessing the right addressee.

The method according to the first aspect of the present invention may further comprise weighting of identified patterns in accordance with a weighting scheme. The weighting scheme may comprise weighting patterns comprising names in the beginning of the message with highest priority. Hence making a first guess based on the prioritized hits and utilizing secondary hits in case of multiple addressees being the best guess. In addition, the weighting scheme may comprise weighting patterns comprising unique words or a unique constellation of symbols or numbers with a second highest priority, patterns comprising words beyond a predetermined length with a third highest priority, patterns comprising words in a foreign language a fourth highest priority. By enlarging the weighting scheme the method may arrive at a best guess fast.

The method according to the first aspect of the present invention may further comprise measuring frequency of patterns used for an addressee in the address list, that is, a number telling how many ties per sent message that the specific word has been used in a message to that recipient. This element provides a further improved probability of guessing the right addressee for the message.

The addressee in the address list according to the present invention may be recorded by a name, street address, telephone number, email address, or any combination thereof. The addressee may further be recorded in the address list with a note section containing miscellaneous information such as birthday or anniversaries.

The method according to the present invention may further comprise searching for a pattern in a message stored in the communication terminal. For example, a message in the inbox or the sent items archive may be searched for a key word written in the message that is to be sent.

The method according to the present invention may further comprise performing a semantic analysis of the message. A more powerful semantic analysis of, for example, a written text could be done and from this semantic data a recipient could be derived with good accuracy.

The above advantages and features together with numerous other advantages and features, which will become evident from below detailed description, is obtained according to a second aspect of the present invention by a system for providing a best guess for a recipient of a message comprising:

(a) a first user interface for enabling a user of the system to record the message;

(b) an identification module for identifying a pattern in the message;

(c) an address list comprising one or more records and a pattern list for recording the pattern and for associating the pattern with a record of the one or more records; and (d) a suggestion module for presenting the record associated with the pattern on a second user interface.

The system according to the second aspect of the present invention may comprise a communication terminal such as a cellular or mobile phone, a personal digital assistant, or any combination thereof. The system may incorporate any elements of the method according to a second aspect of the present invention and may advantageously be implemented in a cellular or mobile phone so as to enable an user of the phone to record a message and utilizing the system to identify a recipient of the message.

The identification module according to the second aspect of the present invention may record the pattern concurrently when the user records the message. The system thus effectively and quickly provides a suggestion for a recipient of the message. The identification module may further identify the pattern and record the pattern temporarily in a cell. Additionally and alternatively, the identification module may identify the pattern and record the pattern by linking a pointer to the pattern, copying the pattern, recording position of the pattern in the message, or any combination thereof. The system thereby may fulfill any customer specific requirements in this regard.

Each record of the one or more records in the address list according to the second aspect of the present invention may further comprise a name, street address, telephone number, email address, or any combination thereof. The record may in addition comprise a note field for recording elements relevant for the persons in the address list, i.e. birthdays or anniversaries.

The identification module according to the second aspect of the present invention may further determine whether the pattern is present in the pattern list, and if the pattern list does not comprise the pattern, then the pattern is recorded in the pattern list. The pattern list may associate an unrecorded pattern identified in the message with a first record, when a user of the system selects the first record as recipient of the message. That is, the system is a self learning system recording a pattern and associating the pattern with a specific record following a user's selection of a record for receiving the message containing the pattern.

The system according to the second aspect of the present invention may incorporate any features of the method according to first aspect of the present invention.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawing, wherein.

DETAILED DESCRIPTION OF THE PREFERRED EMBODIMENTS

In the following description of the various embodiments, reference is made to the accompanying drawing comprising FIGS. 1 and 2, and which form a part hereof, and in which is shown by way of illustration a preferred embodiment in which the invention may be practiced. It is to be understood that other embodiments may be utilized and structural and functional modifications may be made without departing from the scope of the present invention.

Figure 1:
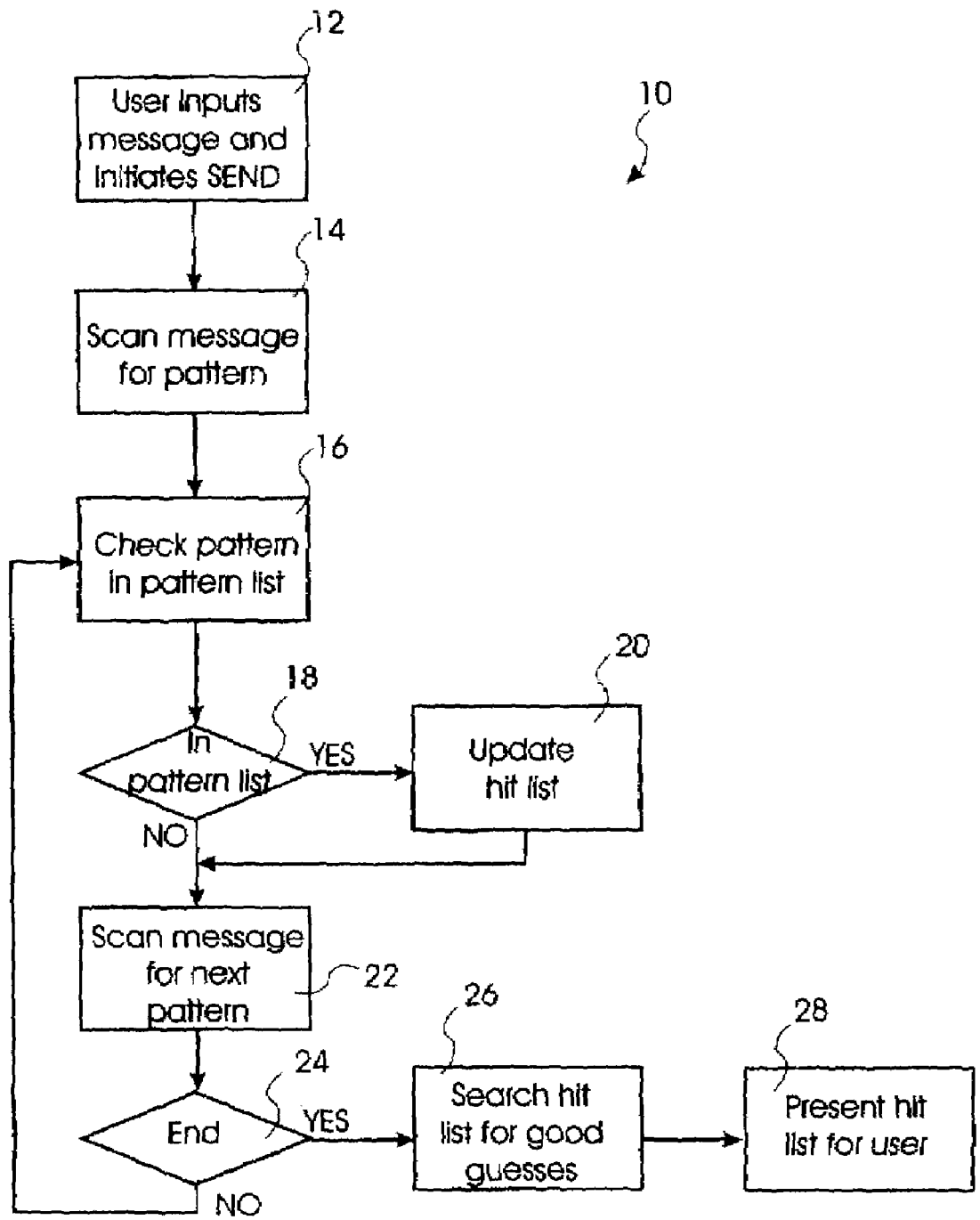
FIG. 1, shows a method according to a first embodiment of the present invention.

FIG. 1 shows a method, designated in entirety by reference numeral 10, according to a first embodiment of the present invention. The first step 12 in the method 10 is when the user has inputted a message, in this case a text message, and indicates that the message is ready to be sent by giving a SEND command. The method 10 enters a second step 14 searching through the message for the first key word, which is compared to the words saved in the phonebooks entries' pattern lists during a third step 16. If the key word is found in a pattern list during a fourth step 18, the entry having that pattern list is added to the hit list or, if already on the hit list, placed in a higher position on the hit list according to how many key words that have been found in its pattern list during a fifth step 20. The method 10 then searches for the next key word in a sixth step 22 and if another key word is found the method 10 repeats the steps 18, 20 and 22 until the end of the message has been reached determined in a seventh step 24. The hit list is then searched in a eight step 26, for entries constituting a good guess, i.e. entries having more than a pre-specified number of hits, which pre-specified number should be in the range of 1 to 5. A good guess could also be the five entries in the hit list having the most hits. These best guesses are the presented to the user during a ninth step 28.

In an alternative embodiment of the present invention each word of a message is checked if it is a key word as it is written. This can be done using a predictive text input mechanism or searching the pattern list for the previously written word every time a space-character is entered.

If no guesses can be made, i.e. if the hit list is empty, the normal possible recipients are shown to the user.

In a further alternative embodiment of the present invention the addressees in the hit list are shown together with the normal possible recipients for the message.

Figure 2:
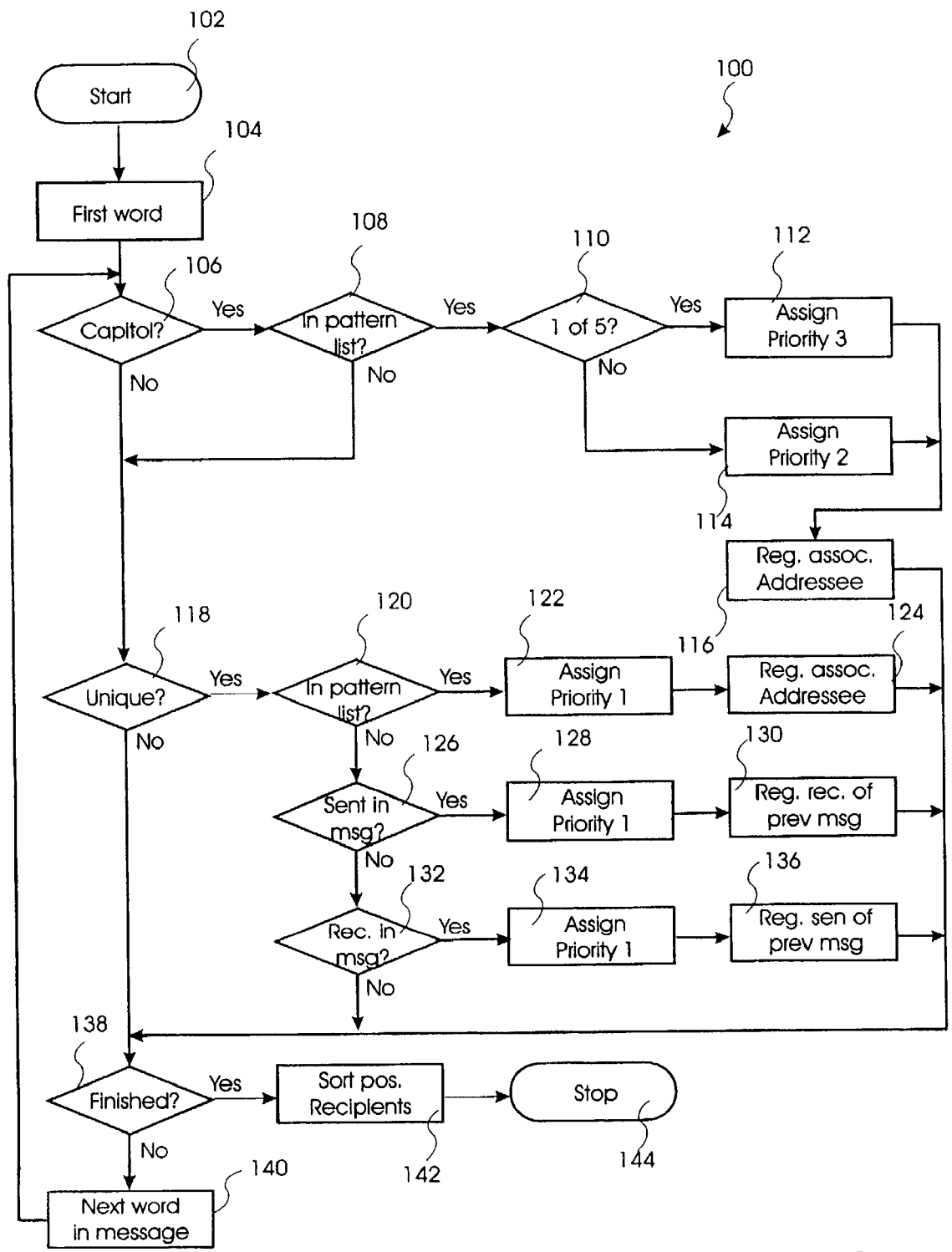
FIG. 2, shows a method according to a second embodiment of the present invention.

FIG. 2, shows a method designated in entirety by reference numeral 100, which method is a second embodiment of the present invention. The method 100 is implemented on a communication terminal such as a cellular or mobile phone comprising a message editor for writing text messages, a address list containing a series of addressees, which may or may not be associated with key words in a pattern list. The pattern may be found by using for example the T9-dictionary of a communication terminal.

In an alternative embodiment of the present invention the cellular or mobile phone comprises an editor for writing and editing text, images, series of images, videos, series of videos, audio recordings, series of audio recordings, or any combination thereof.

The method 100 is initiated during a start step 102, during which the fundamental requirements such as re-establishing pointers and updating required memory area is performed.

Following the start step 102 the method 100 continues on to initiate parsing of a message in step 104. The words in the message are investigated during the following steps. The message may in a first embodiment of the present invention be investigated concurrently with the message being written, or may in a second embodiment of the present invention be investigated subsequent to a specific symbol such as ".", ",", "_", or any combination thereof has been written in the message. Further, in a third embodiment of the present invention the investigation of the message is commenced following a user requesting a "send message" function, or in a fourth embodiment of the present invention the investigation of the message is commenced following a time delay of 1 to 60 seconds.

The investigation of the message starts in step 106, during which each word of the message is examined so as to determine whether they contain a capitol letter. In case the word contains a capitol letter the method 100 proceeds to step 108, during which the pattern list is examined so as to determine whether the pattern list contains a matching key word.

If one of the first words in the message contains a capitol letter it is likely to comprise the name of the recipient hence during step 110 following step 108, the method 100 determines whether one of the first five words in the message contains a capitol letter. In case the one of the first five words in the message contains a capitol letter a priority level 3 is assigned during step 112 otherwise a priority level 2 is assigned during step 114. By assigning a priority level the method 100 improves the probability of identifying the correct recipient among the addressees in the address list. The priority level 3 is the highest priority whereas priority level 1 is the lowest priority. In alternative embodiments further priority levels may be implemented.

The investigated word recognized in the pattern list during step 108 has one or more associated addressees, which during step 116 are registered as potential recipients of the message.

If during step 108 no key word is identified in the pattern list or during step 106 no capitol letter is identified in the investigated word then the method 100 proceeds to step 118, during which is determined whether or not the investigated word is a unique word. A unique word should in this context be construed as a constellation of symbols, letters or numbers, which unique word not necessarily has a meaning to others than the writer and receiver of the message.

If the investigated word is unique the method 100 proceeds to step 120, during which the pattern list is examined so as to determine whether the pattern list contains a matching key word.

If the investigated word may be identified in the pattern list during step 120, the method 100 proceeds to step 122 assigning a priority level 1. Subsequently, during step 124, addressees having the investigated word as a key word are registered as potential recipients of the message.

If the investigated word is not identified in the pattern list during step 120, the method 100 proceeds to step 126. In step 126 previously sent messages are examined so as to determine whether the investigated word is contained therein. If the investigated word is part of a previously sent message, the method 100 during step 128 is assigned a priority level 1 and subsequently during step 130 the receivers of these previously sent messages containing the investigated word are registered as potential recipients of the present message.

If the investigated word is not identified in the pattern list during step 120 and in the previously sent messages, the method 100 proceeds to step 132. In step 132 previously received messages are examined so as to determine whether the investigated word is contained therein. If the investigated word is part of a previously received message, the method 100 during step 134 is assigned a priority level 1 and subsequently during step 136, the senders of these previously received messages containing the investigated word are registered as potential recipients of the present message.

The above described investigation of a word in the message is concluded in step 138, during which the method 100 determines whether the actual investigation position in the message is at the end of file or not, i.e. is the investigation of the complete message concluded. If the investigation is not concluded, the method 100 proceeds to step 140 during which the following word in the message is determined and the process returns to step 106. On the other hand, if the investigation is concluded, the method 100 proceeds to step 142 during which the potential recipients are sorted. The recipient may be sorted after name of addressee, number investigated words are in the pattern lists and associated with the addressee, priority level count, or any combination thereof.

Finally, the method 100 concludes in step 144 during which the method 100 makes itself available for further parsing of messages.

Figure 3:
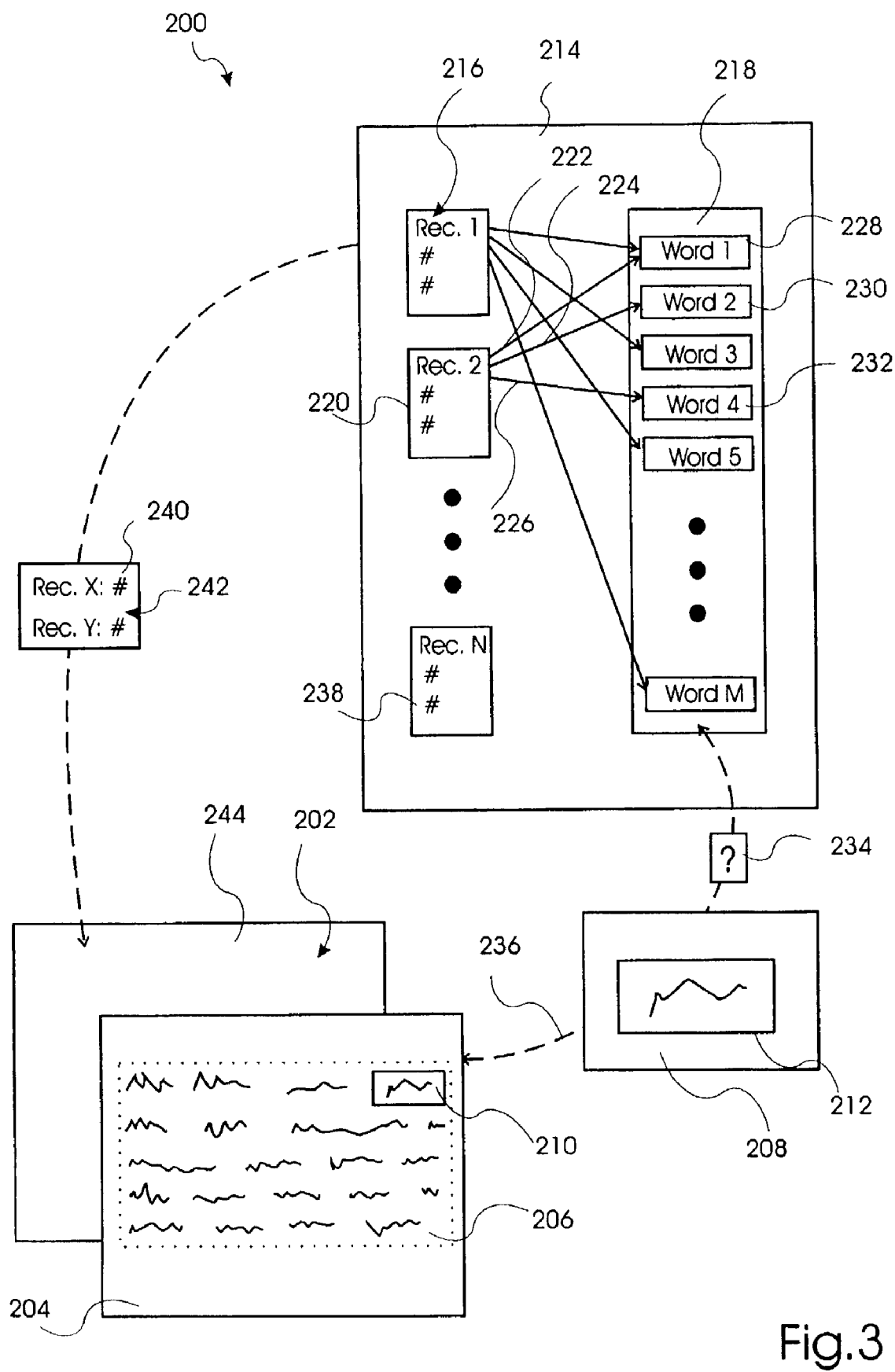
FIG. 3, shows a system according to a preferred embodiment of the present invention.

FIG. 3, shows a system designated in entirety by reference numeral 200 and according to the preferred embodiment of the present invention. The system 200 may incorporated any of the above described method 10 or 100 and may be implemented in any communication terminal such as a mobile or cellular phone, a personal digital assistant, a computer, or any combination thereof.

The system 200 comprises a plurality of user interfaces designated by reference numeral 202. Any number of user interfaces may be implemented for each procedure to be handled by the system 200. In particular, the plurality of user interfaces 202 comprises a message editor 204 enabling a user of the system 200 to record a message 206. While the user records the message 206, the message 206 is simultaneously examined by a identification module 208 for identifying patterns in the message 206, such patterns as illustrated by a pattern 210.

The identification module 208 identifies the pattern 210 and records the pattern 210 temporarily in a cell 212. The identification module 208 may obviously record the pattern 210 by linking a pointer to the pattern 210, copying the pattern 210, recording position of the pattern 210 in the message 206, or any combination thereof.

The system 200 further comprises a address list 214 containing one or more records, which one or more records are designated in entirety by reference numeral 216. Each record in the address list contains a name, street address, telephone number, email address, or any combination thereof.

The records 216 in the address list 214 may be linked to a pattern in a pattern list 218. For example, a record 220 is linked through pointers 222, 224 and 226 to patterns 228, 230 and 232 respectively.

The identification module 208 determines whether the pattern 210 is present in the pattern list 218, illustrated by a questioner box 234 and arrow 236. If the pattern list 218 does not contain the pattern 210, the pattern 210 is recorded in the pattern list 218 and associated with a record later.

A record 238 does not necessarily link to a pattern in the pattern list 218. However, when a message is forwarded, the system 200 associates patterns identified in the message with the record 238, when a user of the system 200 has selected the record 238 container the receiver for the message.

If on the other hand the pattern 210 is contained in the pattern list, a suggestion module 240 registers the associated records 242 linked to the pattern 210 in the pattern list 218. The suggestion module 240 presents the records 242 linked to the pattern 210 on a message transmission user interface 244. The user of the system 200 then may select from the suggested receivers of the message and transmit the message.

The invention claimed is:

1. A method for providing a best guess for a recipient of a message comprising:
    (a) identifying a pattern in the message;
    (b) searching for the pattern in a pattern list comprising one or more patterns for each addressee in an address list;
    (c) registering an addressee in a hit list when the pattern is in the pattern list; and
    (d) determining a first addressee from the hit list and providing the first addressee as a best guess as a recipient of the message.

2. The method according to claim 1, wherein the pattern is identified in the message using a parser.

3. The method according to claim 1, wherein the message comprises at least one of text matter, images, at least one series of images, video streams, at least one series of video streams, audio recordings, at least one series of audio recordings.

4. The method according to claim 1, wherein the message comprises at least one of a short message service format, an unstructured supplementary service data, a multimedia messaging format, and an e-mail format.

5. The method according to claim 1, wherein the pattern comprises at least one of key words, key sounds and key image characteristics.

6. The method according to claim 5, wherein the key words comprise at least one of names, unique words or a constellation of symbols or numbers, words beyond a predetermined length, and words in a foreign language.

7. The method according to claim 6, wherein the method is implemented in a communication terminal.

8. A method in accordance with claim 7, wherein the communication terminal comprises a cellular or mobile phone, a personal digital assistant, or any combination thereof.

9. The method according to claim 1, comprising recording of the pattern in the pattern list for a specific addressee in the address list.

10. The method according to claim 1, comprising determining a second addressee in the hit list and providing the second addressee as a second best guess for a recipient of the message.

11. The method according to claim 1, comprising a range of addressees in the hit list and providing a prioritized guess for the range of addressees, the range comprising 1 to 10 addressees in the hit list.

12. The method according to claim 1, wherein the pattern list comprises a range of patterns for each addressee in the address list comprising from 1 pattern to 20 patterns.

13. The method according to claim 1, comprising weighting identified patterns in accordance with a weighting scheme.

14. The method according to claim 1, comprising measuring a frequency of patterns used for an addressee in the address list.

15. A system for providing a best guess for a recipient of a message comprising:
    (a) a first user interface for enabling an user of the system to record the message;

(b) an identification module for identifying a pattern in the message;
(c) an address list comprising one or more records arid a pattern list for recording the pattern and for associating the pattern with a record of the one or more records; and
(d) a suggestion module for presenting the record associated with the pattern on a second user interface.

16. A system according to claim 15, wherein the system comprises a communication terminal.

17. A system in accordance with claim 16, wherein the communication terminal comprises a cellular or mobile phone, a personal digital assistant, or any combination thereof.

18. A system according to claim 16, wherein the identification module records the pattern concurrently with the user recording the message.

19. A system according to claim 16, wherein the identification module identifies the pattern and records the pattern temporarily in a cell.

20. A system according to claim 15, wherein the identification module identifies the pattern and records the pattern by at least one of linking a pointer to the pattern, copying the pattern, recording position of the pattern in the message, or any combination thereof.

21. A system according to claim 15, wherein each record of the one or more records in the address list comprises at least one of a name, street address, telephone number and an email address.

22. A system according to claim 15, wherein the identification module determines whether the pattern is present in the pattern list, and if the pattern list does not comprise the pattern, then the pattern is recorded in the pattern list.

23. A system according to claim 15, wherein the pattern list associates an unrecorded pattern identified in the message with a first record, when a user of the system selects the first record as recipient of the message.

* * * * *

UNITED STATES PATENT AND TRADEMARK OFFICE
CERTIFICATE OF CORRECTION

| | |
|---|---|
| PATENT NO. | : 7,050,822 B2 |
| APPLICATION NO. | : 10/284209 |
| DATED | : May 23, 2006 |
| INVENTOR(S) | : Nielsen et al. |

It is certified that error appears in the above-identified patent and that said Letters Patent is hereby corrected as shown below:

Column 9,

Line 3, "arid" should read --and--.

Signed and Sealed this

Twenty-third Day of January, 2007

JON W. DUDAS
*Director of the United States Patent and Trademark Office*